July 28, 1936. R. VELUT 2,048,902
LIQUID COOLING APPARATUS
Filed April 1, 1935
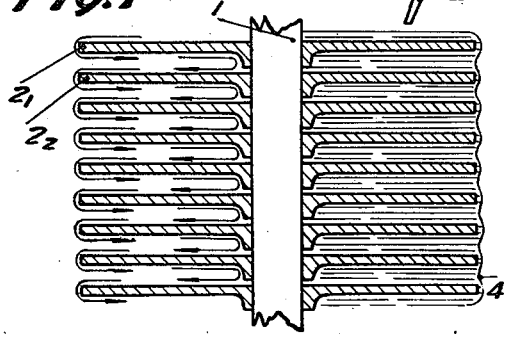
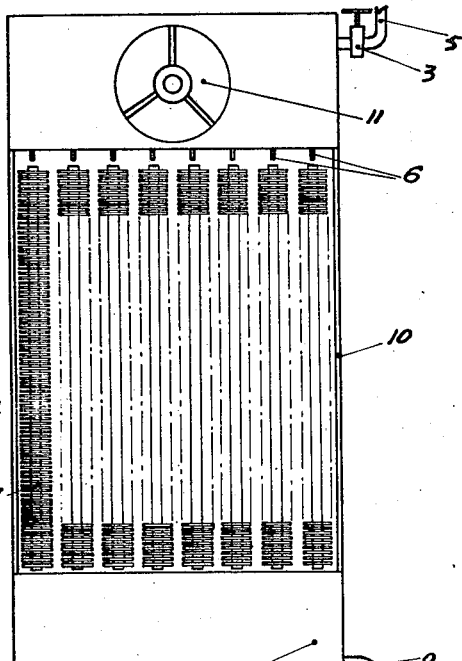
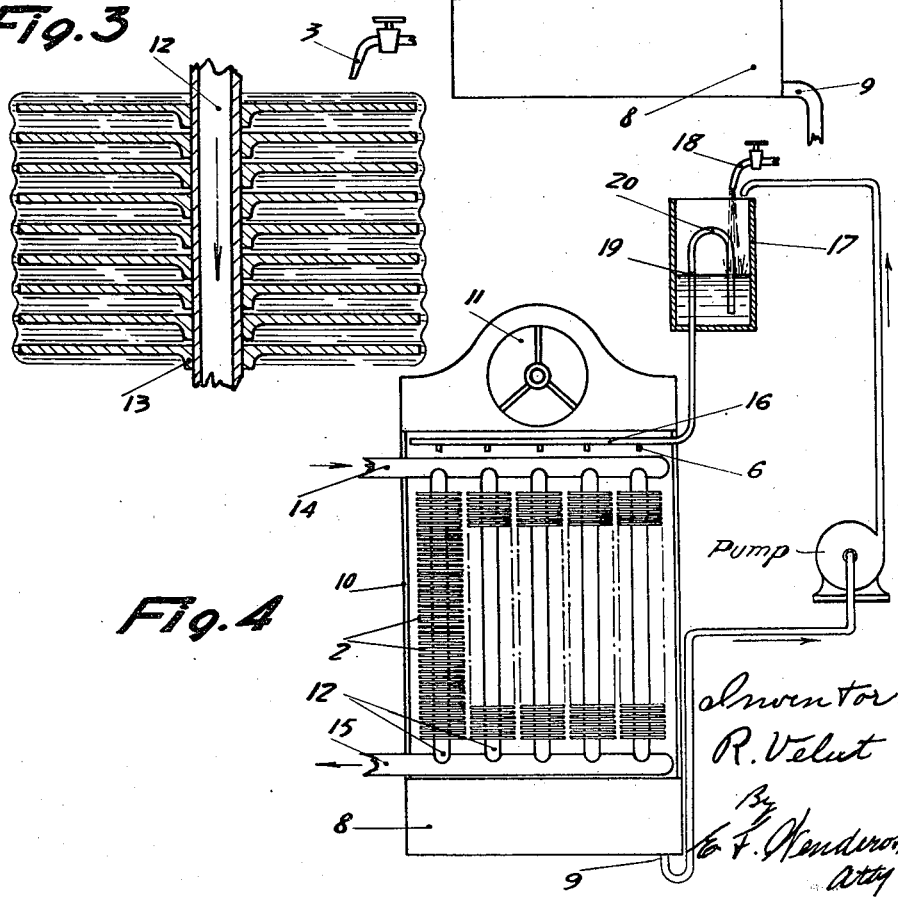

Patented July 28, 1936

2,048,902

UNITED STATES PATENT OFFICE 2,048,902

LIQUID COOLING APPARATUS

René Velut, Paris, France

Application April 1, 1935, Serial No. 14,165
In France April 10, 1934

12 Claims. (Cl. 257—55)

My present invention relates to apparatus for cooling liquids.

It is already known to cool liquids by evaporation by bringing the liquid into contact with air. In this prior art process the liquid is then partly vaporized and because of the heat abstracted during evaporation the temperature of the remaining liquid is lowered. Accordingly, in carrying out this prior art process the liquid usually is sprayed in very fine droplets in order to increase the area of the surface in contact with the air. The said drops are sprayed from a considerable height in order to increase the duration of their fall and consequently the duration of their contact with the surrounding atmosphere.

My present invention is directed to the production of cooling apparatus for liquids wherein the duration of the contact of the liquid with the atmosphere is increased, the speed of the liquid, which falls by gravity, being considerably lessened and in some cases even falling to zero.

My invention is therefore directed to the production of an apparatus for permitting a controlled duration of the contact between the liquid which is to be cooled and the air, regardless of what might be the height from which the said liquid falls. It is the contact of this air with the free surface of the liquid which produces the evaporation.

The apparatus according to my invention comprises essentially one or more elements each constituted by walls spaced fairly closely together. These walls may have any desired shape and may extend in any desired direction. There is however the single requisite; that they provide a free surface serving as the evaporation surface.

I prefer to deliver the liquid onto the top of the elements constituted by the said walls, in a quantity chosen according to the result to be obtained, i. e. the percentage and quantity to be evaporated, and the liquid progresses on a path determined by capillarity by virtue of gravity pull.

The distances between the walls are sufficiently small that during the feeding, the gravity pull is greater than the surface tension. As a result the liquid flows along said path and fills the gaps between said walls. However, when the intake of liquid is stopped the liquid remains entrapped between said walls and is motionless so that the influence of the surface tension momentarily becomes greater than the effect of gravity.

I have found it to be particularly advantageous to constitute the walls of a good heat conducting material, such as a metal, in order to abstract from the enclosed mass of liquid the heat necessary to evaporate liquid from the outer surface of the walls and thus to facilitate the direct cooling of said mass during the passage of the latter between the walls.

In most cases it is also advantageous to dispose the walls constituting the elements parallel to each other, preferably along substantially horizontal axes, but of course the scope of the invention is not limited to these particular cases.

Solely by example and by no mean intended as a limitation the following disclosure indicates, with reference to the appended drawings, certain forms of execution of the invention.

In the drawing:

Fig. 1 is a cross section through a part of a cooling element according to my invention.

Fig. 2 shows a device according to my invention in which the front panel is removed.

Fig. 3 is a cross-section of a modification of the element shown in Fig. 1, in which a fluid is cooled through the intermediary of a previously cooled liquid.

Fig. 4 is a view similar to Fig. 2, of a device modified in accordance with the construction of Fig. 3.

The part shown in Fig. 1 comprises a support such as a bar 1, substantially vertical, on which are fixed plates 2 of any convenient shape, (square, circular, etc.) The liquid to be cooled is fed by suitable means such as an adjustable cock 3 onto the highest plate $2^1$.

The liquid then flows downwardly by gravity and, provided that the plates 2 are sufficiently close to each other, is retained between them by capillarity.

I have ascertained that under these conditions, the liquid, after having filled the intervals between the plates, does not flow down directly over the edges and the outer surface of the thin liquid layers remaining between them, as might be expected, but instead slides along the entire surface of each of said plates. Thus the liquid first follows the upper surface of plate $2^1$, then the rim or edge thereof, next the lower surface of the same plate $2^1$, then the outer surface of the bar 1, the upper surface of plate $2^2$, thereafter the rim and lower surface thereof and so on, displacing the liquid ahead of it, the travel of the liquid being thus as fully indicated by the arrows on the left side of Fig. 1.

It is thus possible to renew completely and continuously the liquid contained in the element. By way of example, if the liquid is water as is usually the case, the plates may be spaced from each other a distance of from 2 to 3 millimeters, in order to bring about proper operation of the apparatus.

The vaporization takes place at the outer surface 4.

If the flow of the liquid is stopped, say by closing the cock 3, then the effective area of the outer surface is only the sum of the areas of the outer cylindrical surfaces of the layers of liquid lying between the plates; but when the liquid is flowing this area is increased materially by the sum of the areas of the cylindrical rims of the plates.

It will be readily understood that with the operation outlined in the foregoing, it is possible to obtain between the air and the liquid to be cooled a contact the duration of which is controllable and may be as long as desired, provided only that the number of plates 2 is sufficient and that they are spaced at the proper intervals. I have found that if the elements are made rather thick in order to facilitate the abstraction of heat from the center to the outer surface of the mass of liquid, then it is preferable to form the walls of the device from metal.

In Fig. 2 is pictured an apparatus according to my invention, comprising a cabinet 10 the front panel of which has been removed. The liquid to be cooled is delivered by a pipe 5 preferably provided with a cock 3 for controlling the supply of liquid. The liquid is sprayed from jets 6 upon a plurality of elements 7 similar to the single one previously disclosed and illustrated with respect to Fig. 1. The liquid falling from the lowest plate of the elements 7 is collected in the fluidtight bottom 8 of the cabinet and is removed through a duct 9. A ventilator 11 shown as being of the electric type, may be provided for blowing air around the elements 7 in order to improve the vaporization.

In many cases the liquid cooled by evaporation is used as an intermediary agent for cooling another fluid. After serving as an intermediary, and thus being heated anew the liquid is pumped from the lowest part of the apparatus, back to the top. It is sometimes possible, however, to use the liquid as an intermediate cooling means without so much complication. Fig. 3 shows a modified form of element according to my invention specially designed for this purpose.

In this case the support for the plates, instead of comprising a solid bar 1, is constituted by a pipe 12 inside which flows, say in the direction of the arrow, the fluid to be cooled. The plates 2, which preferably are of metal, are preferably fixed on said pipe 12 by means of sleeves 13 in order to provide a better heat conduction and a convenient spacing between said plates.

The intermediate liquid is held between the closely spaced plates and is vaporized on its free surface, so that it thus cools the fluid flowing in the inner tube by convection, and by transmission of heat through the metal plates and the tube itself due to their high thermal conductivity.

In this case the quantity of liquid which must be fed to the top of the elements preferably should be equal to that which has been vaporized. In this case it is desirable that the liquid should remain substantially motionless at the lower end of the elements. However, when desired it is feasible to move the liquid in a closed circuit, a pump being employed to restore the exhaust liquid from the bottom of the apparatus back to the top to renew the cycle.

Fig. 4 shows by way of example an apparatus similar to that of Fig. 2, comprising a cabinet 10, inside which are disposed several elements of the type illustrated in Fig. 3, the tubes 12 being connected at one end to an input pipe or header 14 and at the other end to an output pipe or header 15, thus permitting the passage of the fluid to be cooled through the tubes 12; the liquid to be vaporized on said elements is delivered through a duct 16 having a plurality of spray jets 6 disposed above said elements for causing the liquid to fall thereon by gravity. The cabinet is provided with a fluidtight bottom and a duct 9 for collecting and evacuating the non-vaporized liquid, and is also shown as provided with a ventilator 11 for blowing air around the elements.

In the figure the elements have all been represented as mounted in parallel, but obviously any number of said elements may be connected in series with each other.

In some cases, and more particularly when the amount of cooling desired is very great, the quantity of liquid to be supplied on each element should be quite small, so that with an adjustable cock, it is found to be very difficult, and sometimes even impossible, to distribute uniformly such a small quantity of liquid to the jets 6, despite the fact that the whole area of the edges of the liquid layers contained between the plates can be used as an evaporating surface.

According to my invention, this difficulty may be avoided simply by distributing the liquid intermittently, by suitable conventional devices, so that during each period of supply the quantity thus distributed is large enough to be divided equally between the several jets 6.

In Fig. 4 a known device for intermittent feeding is illustrated.

It consists of a tank 17 of suitable size wherein the liquid flows continuously from a conveniently adjusted cock 18, and in which is disposed a siphon 19 through which the tank is quickly emptied as soon as the level of the liquid reaches the top 20 of the siphon.

What I claim is:

1. Apparatus for cooling liquids by evaporating part of the liquid by air, comprising at least one element having walls close enough to each other to be able to retain between them the liquid by capillarity and means for distributing said liquid onto the top of the element.

2. Apparatus for cooling liquids by evaporating part of the liquid by air, comprising at least one element having walls close enough to each other to be able to retain between them the liquid by capillarity, and adjustable means for distributing said liquid onto top of the elements, for controlling the quantity of liquid, and hence the degree of cooling.

3. Apparatus for cooling liquids as claimed in claim 1 wherein the walls are of metal.

4. Apparatus for cooling liquids as claimed in claim 1 wherein the walls are plane.

5. Apparatus for cooling liquids as claimed in claim 1 wherein the walls are horizontal.

6. Apparatus for cooling liquids as claimed in claim 1 wherein the walls are plane and horizontal.

7. Apparatus for cooling liquids, comprising at least one element having a substantially vertical support; a plurality of superposed, substantially horizontal plates fitted substantially axially over said support, and close enough to each other to retain by capillarity the liquid between them, and adjustable means for feeding the liquid to be cooled onto the topmost plate.

8. Apparatus for cooling liquids, comprising a cabinet having a fluidtight bottom; evacuating means for the bottom of said cabinet; a plurality of elements in said cabinet above said fluidtight bottom, each element comprising a substantially vertical support, a plurality of superposed, substantially horizontal plates fitted substantially axially over said support and close enough to each other to retain by capillarity the liquid between them; adjustable means for feeding the liquid into the cabinet; means for distributing the liquid uniformly over the elements; and a ventilator disposed in the cabinet so that it blows air around the elements.

9. Apparatus for cooling liquids by evaporating part of the liquid by air, and wherein the previously cooled liquid is used for cooling a fluid, comprising at least one element having walls close enough to each other to be able to retain between them the liquid by capillarity; means for distributing said liquid onto the top of the elements; a metallic tubular means adapted to be traversed by the fluid to be cooled; the walls of said means serving to transmit heat from the fluid to be cooled to the cooling liquid.

10. Apparatus for cooling liquids wherein the cooled liquid is used for cooling a fluid, comprising at least one element having a substantially vertical tube inside which flows the fluid to be cooled, a plurality of superposed, substantially horizontally extending metallic plates fitted substantially axially over said tube and close enough to each other to retain by capillarity the liquid between them; and adjustable means for feeding the liquid to be cooled onto the highest plate, for controlling the quantity of liquid, and hence the degree of cooling.

11. Apparatus for cooling liquids wherein the cooled liquid is used for cooling a fluid, comprising a cabinet with a fluidtight bottom, evacuating means for the bottom of said cabinet; a plurality of elements in said cabinet above said fluidtight bottom, each comprising a substantially vertical tube; superposed, substantially horizontal metallic plates fitted substantially axially over said tube and close enough to each other to retain by capillarity the liquid between them; an input and output pipe for the fluid flowing through said tubes; a duct for the supply of the liquid disposed on and above said elements; adjustable means for supplying to said duct during a determined time a quantity of liquid which is substantially equal to that vaporized on the elements during the same time; and a ventilator disposed so that it blows air round the elements.

12. Apparatus for cooling liquids wherein the cooled liquid is used for cooling a fluid, comprising a cabinet with a fluidtight bottom; evacuating means for the bottom of said cabinet; a plurality of elements in said cabinet above said fluidtight bottom, each element comprising a substantially vertical tube; superposed, substantially horizontal metallic plates fitted substantially axially over said tube, and close enough to each other to retain by capillarity the liquid between them; an input and output pipe for the fluid connected with said tubes; a duct for the supply of the liquid disposed above said elements; jets on said duct so disposed as to cause the liquid to fall upon the elements; and adjustable means for intermittently supplying said duct during a determined time with a quantity of liquid substantially equal to that vaporized on the elements during the same time.

RENÉ VELUT.